United States Patent
Lai et al.

(10) Patent No.: US 12,517,821 B2
(45) Date of Patent: Jan. 6, 2026

(54) METHOD FOR OPERATING A STORAGE SYSTEM, STORAGE DEVICE, AND NON-TRANSITORY STORAGE MEDIUM

(71) Applicant: SK hynix Inc., Icheon-si (KR)

(72) Inventors: Ching-Chung Lai, Zhubei (TW); Lian-Chun Lee, Zhubei (TW); Chun-Shu Chen, Zhubei (TW)

(73) Assignee: SK hynix Inc., Icheon-si (KR)

( * ) Notice: Subject to any disclaimer, the term of this patent is extended or adjusted under 35 U.S.C. 154(b) by 103 days.

(21) Appl. No.: 18/635,556

(22) Filed: Apr. 15, 2024

(65) Prior Publication Data

US 2025/0291712 A1   Sep. 18, 2025

(30) Foreign Application Priority Data

Mar. 18, 2024 (TW) .................. 113109953

(51) Int. Cl.
*G06F 12/02* (2006.01)
(52) U.S. Cl.
CPC .. *G06F 12/0246* (2013.01); *G06F 2212/7201* (2013.01)
(58) Field of Classification Search
CPC ............... G06F 12/0246; G06F 2212/7201
See application file for complete search history.

(56) References Cited

U.S. PATENT DOCUMENTS

| | | | |
|---|---|---|---|
| 10,222,984 B1 * | 3/2019 | O'Brien, III | G06F 3/0644 |
| 11,074,173 B1 | 7/2021 | Gordon | |
| 11,360,707 B2 * | 6/2022 | Seo | G11C 16/0483 |
| 2017/0242592 A1 * | 8/2017 | Camp | G06F 3/0616 |
| 2019/0278498 A1 | 9/2019 | Dedrick | |
| 2020/0320019 A1 * | 10/2020 | Byun | G06F 12/10 |
| 2022/0129189 A1 * | 4/2022 | Zhou | G06F 3/0655 |
| 2022/0300205 A1 * | 9/2022 | Lee | G06F 3/0659 |
| 2024/0272822 A1 * | 8/2024 | Shachar | G06F 3/0604 |

FOREIGN PATENT DOCUMENTS

CN        114356237 A        4/2022

* cited by examiner

*Primary Examiner* — Sean D Rossiter
(74) *Attorney, Agent, or Firm* — WILLIAM PARK AND ASSOCIATES LTD.

(57) ABSTRACT

A method for operating a storage system, a storage device and a non-transitory storage medium thereof are provided. The method comprises following steps. By a controller of the storage system, information associated with respective load levels of a plurality of flash transition layers (FTLs) of the storage system is detected. By the controller, sizes of over-provisioning (OP) portions associated with the plurality of FTLs of the storage system individually are adjusted dynamically based on the detected information associated with the respective load levels of the plurality of FTLs.

20 Claims, 11 Drawing Sheets

METHOD FOR OPERATING A STORAGE SYSTEM, STORAGE DEVICE, AND NON-TRANSITORY STORAGE MEDIUM

CROSS-REFERENCE TO RELATED APPLICATION

This non-provisional application claims priority under 35 U.S.C. § 119 (a) to Taiwanese Patent Application No. 113109953 filed on Mar. 18, 2024, in the Taiwan Intellectual Property Office, the entire contents of which application is incorporated herein by reference.

BACKGROUND OF THE INVENTION

1. Field of the Invention

The present invention relates to an electronic device, and in particular to a method for operating a storage system, a storage device, and a non-transitory storage medium thereof.

2. Description of the Related Art

Non-volatile storage devices, such as storage devices based on flash memory, are extensively applied on electronic devices. Moreover, non-volatile storage devices, such as solid-state storage devices (SSDs) have also gradually become storage devices equipped in a computer system including desktop computers, laptop computers and servers.

In the world of industrial computer interfaces, Non-Volatile Memory Express (NVMe) is an open, logical-device interface specification for accessing a computer's non-volatile storage media usually attached via the Peripheral Component Interconnect Express (PCI Express or PCIe) bus. NVMe is known for its quick response time, achieved through a simplified command set and by taking advantage of the parallel capabilities of contemporary storage devices. It brings high throughput, making it essential for applications that need fast access to large amounts of data.

In NVMe technology, a namespace represents a collection of logical block addresses (LBA) of a storage device with a specific identifier. The namespace defines a logical space within a storage device that the operating system and applications can address, allowing for efficient management and allocation of storage resources. The flexibility of namespaces in NVMe technology is noteworthy. They enable efficient partitioning of a storage device, facilitating the isolation of storage areas for different applications or users. This granular control enhances system efficiency and simplifies data management.

In tandem with NVMe, overprovisioning is a strategy to optimize the performance and lifespan of industrial storage solutions. Overprovisioning involves including extra storage capacity that users cannot directly access but is required for the internal operations of the storage device. It helps distribute write and erase cycles evenly across the entire storage area, extending the life of the storage device. Overprovisioning also ensures that spare blocks are available to replace potentially faulty ones, maintaining the reliability of the storage device. Additionally, it provides space for background tasks such as garbage collection and wear leveling, thus optimizing performance.

BRIEF SUMMARY OF THE INVENTION

A method for operating a storage system, a storage device and a storage medium thereof are provided according to various embodiments. Accordingly, management of over-provisioning in a storage system can be implemented to adjust the over-provisioning of multiple FTLs dynamically.

Embodiments of a method for operating a storage system are provided. The method includes steps of: (a) detecting, by a controller of the storage system, information associated with respective load levels of a plurality of flash transition layers (FTLs) of the storage system; and (b) dynamically adjusting, by the controller, sizes of over-provisioning (OP) portions associated with the plurality of FTLs of the storage system individually based on the detected information associated with the respective load levels of the plurality of FTLs.

Embodiments of a storage device are further provided. The storage device includes a plurality of memory chips and a controller. The controller is coupled to the plurality of memory chips, and the controller is configured to perform multiple operations including: (a) detecting information associated with respective load levels of a plurality of flash transition layers (FTLs) of the storage system; and (b) dynamically adjusting sizes of over-provisioning (OP) portions associated with the plurality of FTLs of the storage system individually based on the detected information associated with the respective load levels of the plurality of FTLs.

In some embodiments of the method or storage device, the step or operation (a) includes detecting write amplification information and analyzing write requests information, for the plurality of FTLs of the storage system.

In some embodiments of the method or storage device, when a difference in write amplification between a first FTL and a second FTL of the plurality of FTLs is equal to or greater than a threshold, the step or operation (b) is performed.

In some embodiments of the method or storage device, when number of access operations reaches a threshold, the step or operation (b) is performed.

In some embodiments of the method or storage device, the step or operation (b) is performed whenever a specific period of time is reached.

In some embodiments of the method or storage device, in the step or operation (b), when a first FTL and a second FTL of the plurality of FTLs have a first load level and a second load level which is less than the first load level, respectively, the controller adjusts the first FTL to release at least one over-provisioning block of the first FTL, and provides the second FTL with at least one over-provisioning block.

In some embodiments of the method or storage device, a total number of the sizes of over-provisioning (OP) portions associated with the plurality of FTLs is a fixed number, regardless of adjustment of the sizes of over-provisioning (OP) portions for individual FTLs' among the plurality of FTLs.

In some embodiments of the method or storage device, the step or operation (b) includes determining the load levels based on the detected information, and determining number of OP blocks for the OP portion for each of the plurality of FTLs based on the determined load levels.

In some embodiments of the method or storage device, the step or operation (b) further includes adjusting the number of OP blocks of the OP portion for an FTL of the plurality of FTLs based on the determined number of OP blocks for the OP portion for the FTL.

In some embodiments of the method or storage device, the step or operation (b) further includes notifying an FTL of the plurality of FTLs to perform garbage collection (GC) to release free OP blocks when the first FTL is adjusted to have a reduced number of OP blocks.

Embodiments of a non-transitory storage medium are further provided. The non-transitory storage medium stores program instructions that, when executed by a storage system, cause the storage system to perform a method according to any of the embodiments of the method above.

Thus, a method for operating a storage system, a storage device and a non-transitory storage medium thereof are provided according to the embodiments above. Accordingly, dynamic over-provisioning management can be implemented in a storage system to adjust the spare capacity allocated to multiple flash translation layers (FTLs) over time. This allows the overall system performance to be optimized by adapting the over-provisioning levels of individual FTLs to meet changing workload demands.

DETAILED DESCRIPTION OF THE INVENTION

To fully understand the objects, features and effects of the present disclosure, the present disclosure is described in detail by way of the specific embodiments with the accompanying drawings below.

Figure 1:
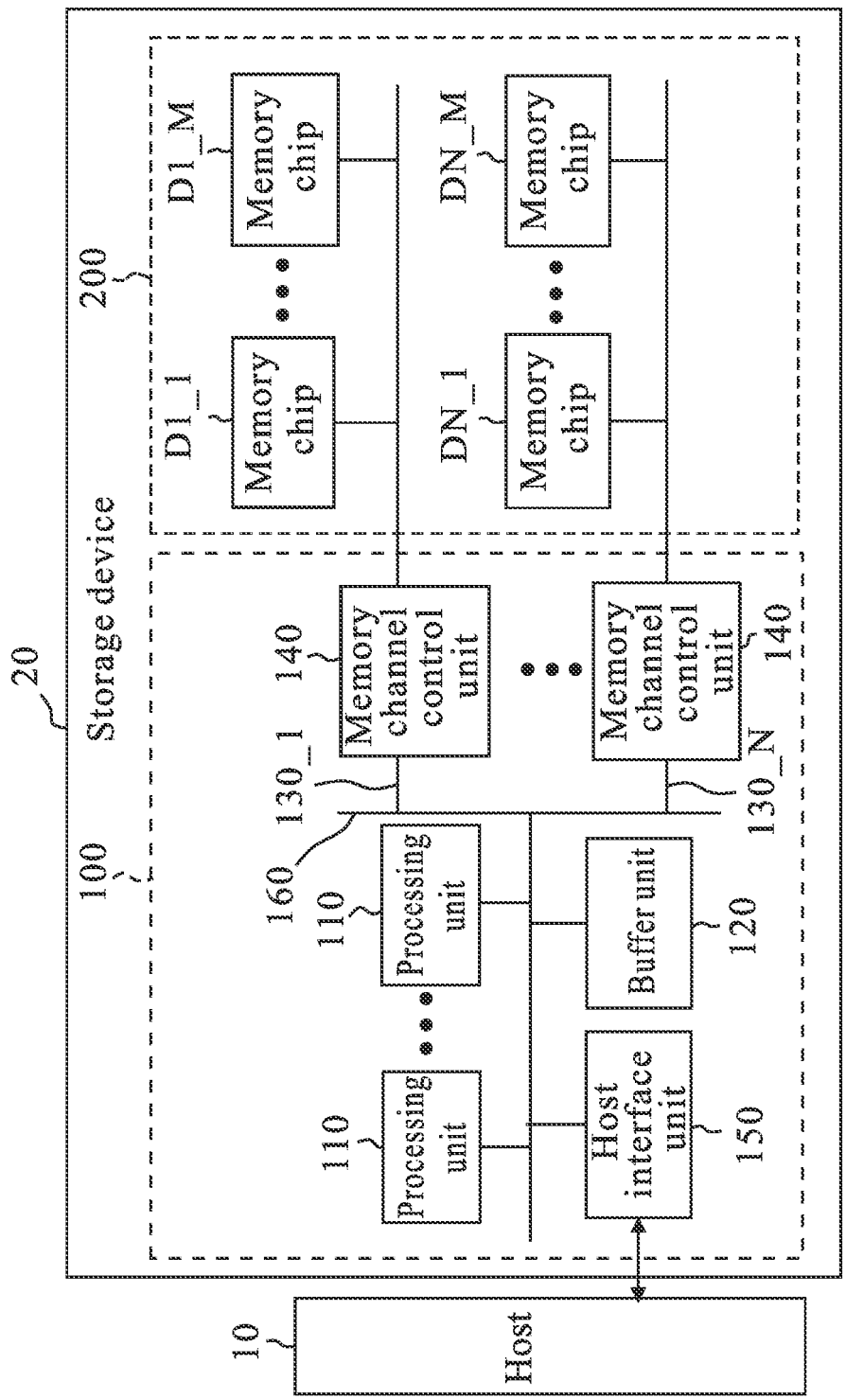
FIG. 1 is a schematic block diagram of a storage device according to an embodiment.
Figure 2:
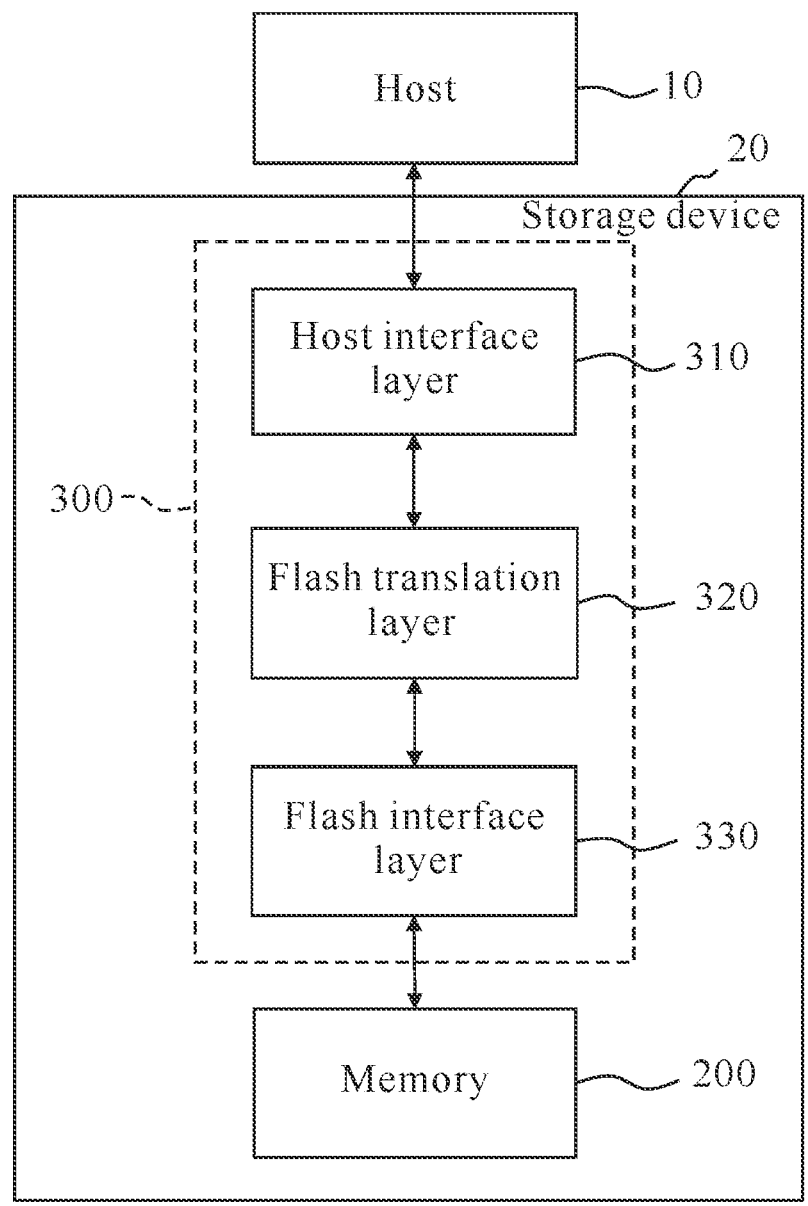
FIG. 2 is a schematic block diagram of a controller according to an embodiment.
Figure 3:
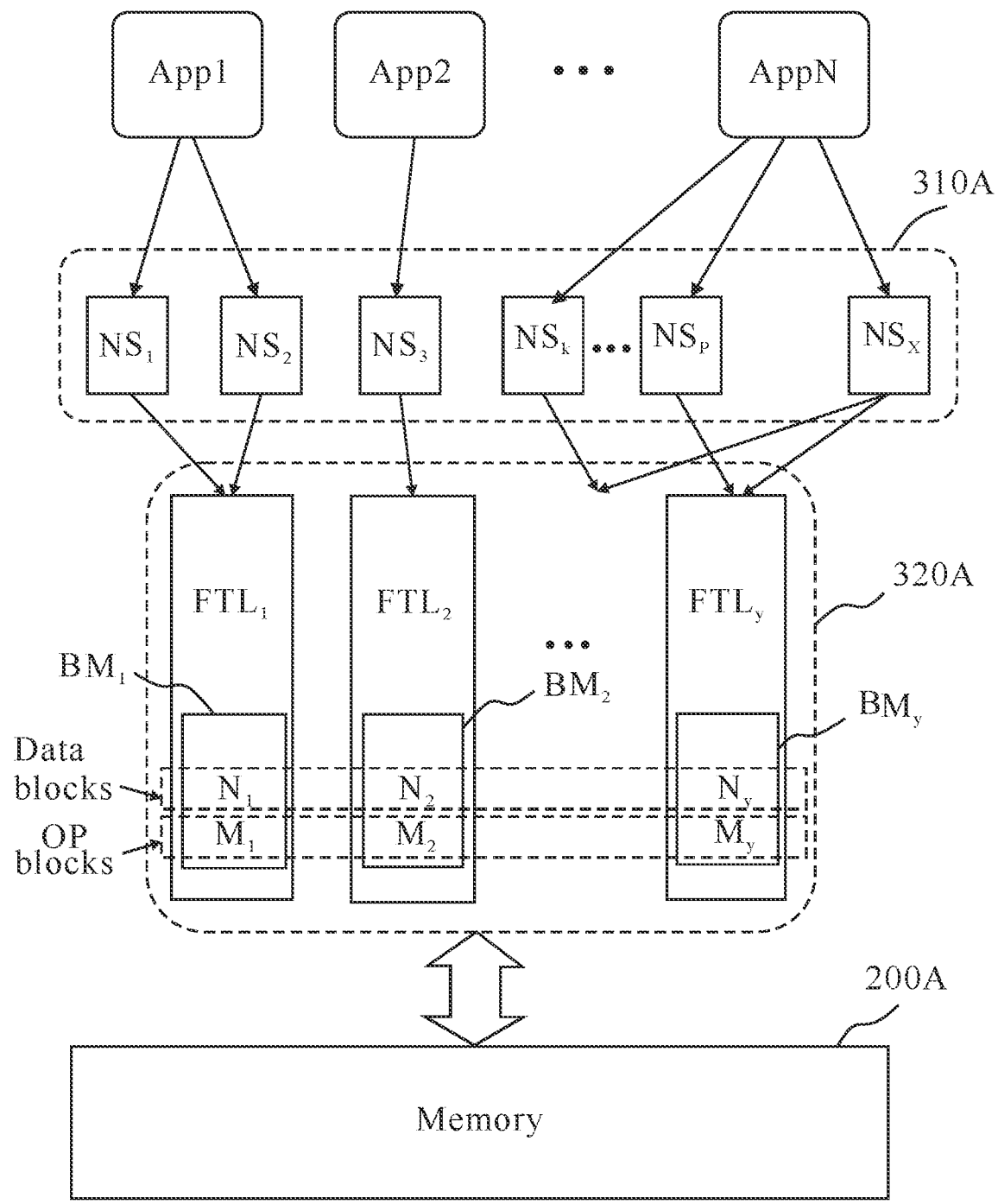
FIG. 3 is a schematic block diagram of flash transition layers and block management of a controller according to an embodiment.

FIG. 1 shows a storage device according to an embodiment of the present disclosure. FIG. 2 shows a controller according to an embodiment. FIG. 3 shows flash transition layers and block management according to an embodiment. A storage device 20 shown in FIG. 1 can be used to perform a method for operating a storage system of FIG. 4A or related embodiments (detailed description is to be given below later), thus facilitating dynamic adjustment on over-provisioning of multiple FTLs. FIGS. 1-3 depict embodiments of suitable application scenarios for implementation based on the method of FIG. 4A. It should be noted that the implementation is not limited to the examples.

As shown in FIG. 1, the storage device 20 includes a controller 100 and a memory 200. The controller 100 includes one or more processing units 110, a buffer unit 120, a plurality of channels 130_1 to 130_N (wherein N is an integer greater than 1, for example) and corresponding memory channel control units 140. The buffer unit 120 may be implemented by a volatile memory or a non-volatile memory. The memory 200 includes a plurality of memory chips D1_1-D1_M to DN_1-DN_M (where N and M are integers greater than 1, for example). For example, the memory chip is a flash memory, e.g., a NOR memory, a NAND memory or so on. Certainly, the implementation of the present disclosure is not limited to the examples above.

The controller 100 can receive a read request or a write request from a host 10 by communicating with the host 10 through a host interface unit 150. The controller 100 generates a corresponding read command or write command corresponding to the host read request or the host write request, and sends the corresponding command generated to the memory channel control unit 140 of the corresponding channel (for example, 130_1 to 130_N). The memory channel control unit 140 is for controlling at least one memory chip. For example, the memory channel control unit 140 sends a data read command to one of the memory chips and sends data read accordingly into the controller 100, for example, into the buffer unit 120. The controller 100 sends the data requested by the host 10 to the host 10. In another example, the memory channel control unit 140 writes, according to a data write command, data to be written into the memory chip. When the controller 100 controls an operation of the memory 200, the buffer unit 120 may store data used by the controller 100 and the memory 200 for various operations, such as a read operation, a write operation, a programming operation and an erase operation. In FIG. 1, the memory channel control units 140 perform read or write operations by using parallel processing. Moreover, the processing unit 110 may be electrically coupled to the channels (e.g., 130_1 to 130_N) through a bus 160. Certainly, the implementation of the present disclosure is not limited to the examples above. For example, each of the memory channel control units may be implemented by a logic circuit or a programmable circuit, or be implemented in the form of software and be executed by the processing unit 110.

The host interface unit 150 may process commands and data provided from the host 10, and may communicate with the host 10 by at least one of various interface protocols including Peripheral Component Interconnect Express (PCIe), Non-Volatile Memory express (NVMe), Universal Flash Standard (UFS), and so on.

Refer to both FIG. 1 and FIG. 2. FIG. 2 shows a schematic block diagram of a controller according to an embodiment. FIG. 2 shows the architecture of the controller 300 implemented in the form of firmware or software. For example, the controller 300 includes a host interface layer 310, a flash translation layer 320, and a flash interface layer 330. The host interface layer 310 is for communicating with the host 10 and serves as an interface between the host 10 and the controller 300. The flash translation layer 320 is for managing read, write and erase operations. The flash translation layer 320 is further for translating a logical address (for example, a logical block address or a logic page address) to a physical address (for example, a physical block address or a physical page address) corresponding to the memory chips (for example, D1_1-D1_M to DN_1-DN_M) of the memory 200. The flash interface layer 330 is for processing communication between the flash translation layer 320 and the memory 200, for example, sending a command from the flash translation layer 320 to the memory 200.

The controller 300 in FIG. 2 may be implemented in the form of a hardware architecture in FIG. 1. The flash translation layer 320 needs to refer to and maintain an address mapping table when performing logical-to-physical address translation. Due to a large data amount of an address mapping table, the flash translation layer 320 stores a partial section of the address mapping table in a cache. When the cache does not contain the correspondence between logical addresses and physical addresses needed for translation, the flash translation layer 320 updates the contents of the section of the address mapping table in the cache and hence generates a mapping table read command. Moreover, in application scenarios of some memory products, such as eMMC or other memory products, the address mapping table is stored in a memory of the memory product; however, the present disclosure is not limited to the examples above.

The controller 300 controls various operations with respect to the memory 200, for example, write operations, read operations, programming operations and erase operations. For example, the controller may generate a write command in response to a write request of the host 10, and execute the write command generated. The controller may store host write commands using a command queue. The controller may sequentially process the host write commands stored in the command queue so as to perform a data write operation.

In addition, the controller 300 can further control a firmware algorithm for the flash translation layer 320. For example, the controller 300 may realize algorithms of garbage collection (GC), wear-leveling (WL), block reclaim (BC) and runtime bad block (RBB).

FIG. 3 is a schematic block diagram of flash transition layers and block management of a controller according to an embodiment. In the embodiment of FIG. 3, a solid storage device (SSD) is taken as an example of a storage device 20, wherein multiple namespaces supported by NVMe technology or partitions supported by UFS can be provided and are accessible to the host. A host interface layer 310A, as an embodiment of host interface layer 310, provides a plurality of namespaces $NS_1, NS_2, \ldots, NS_k, \ldots, NS_p$, to $NS_x$ which are accessible to the host, wherein k, p, x are positive integers and k<p<x. The host 10 may execute a plurality of applications denoted by App1, App2 to AppN, which are assigned to access associated namespaces. A flash translation layer 320A, as an embodiment of flash translation layer 320, includes a plurality of flash transition layers $FTL_1$, $FTL_2$ to $FTL_y$, each of which performs block management to provide a specific number of associated data blocks and a specific number of associated over-provisioning (OP) blocks, where y is a positive integer greater than one. For example, the $FTL_i$ includes a block management unit $BM_i$ to manage $N_i$ data blocks and $M_i$ OP blocks, where i represents an integer from 1 to y. For the $FTL_i$, for example, the block management unit $BM_i$ is responsible for mapping logical data blocks to physical data blocks in the memory for the $N_i$ data blocks and $M_i$ OP blocks, respectively. In addition, the total number of the data blocks, $N_1+N_2 \ldots +N_y$, is a first fixed number while the total number of the OP blocks, $M_1+M_2 \ldots +M_y$, is a second fixed number.

For example, an SSD controller, such as a high performance NVMe SSD controller, can be configured to adopt multiple processing units with multiple FTLs to maintain the high performance input/output (I/O) throughput. The host can assign specific namespaces to the specific FTLs for managing the namespaces according to their characteristics or requirement. For example, in FIG. 3, namespaces $NS_1$ and namespace $NS_2$ are assigned to an independent $FTL_1$ for security requirement, namespace $NS_3$ is assigned to $FTL_2$ to manage for high performance requirement, and a few namespaces such as $NS_k$, $NS_p$, and $NS_x$ are assigned to one or two FTLs for certain concern. This may result in an unbalanced load on each FTL.

For example, if an FTL with a higher write load, the heavy data writes will trigger GC operations more frequently than the FTL with a lighter load. In addition, an FTL with a higher load may affect overall performance. For example, a write request from the application AppN triggers the GC operation in the $FTL_y$. The $FTL_y$ cannot serve requests from the application App2 (which is assigned to access the namespace $NS_3$) but the application App1 is waiting for the application App2's event or response. In this case, there are many software applications and FTLs are in waiting state, but only one FTL ($FTL_y$) is busy in GC operation.

Since the FTL with a higher (write) load will be more often busy with GC operations, it can be said that an FTL with a higher load is equivalent to the FTL with higher frequency GC operations. Therefore, balancing the GC frequency of all FTLs will help balance the load of all FTLs.

In general, an $FTL_i$ manages '$N_i$' data blocks (e.g., NAND flash blocks for data) and '$M_i$' NAND over-provisioning (OP) blocks (e.g., NAND flash blocks for over-provisioning), where the available storage capacity provided to the user is the capacity of the '$N_i$' data blocks, and the number of over-provisioning blocks, '$M_i$', is usually proportional to number of data blocks, '$N_i$'. The GC operation is triggered while there are not enough available (free) blocks. Therefore, if more over-provisioning blocks are given in the FTL, the frequency of GC can be reduced. Conversely, if less over-provisioning blocks are given, the GC operations will occur more often.

Accordingly, in order to improve performance of the storage device, a method for operating a storage system is provided according to an embodiment. In this method, it is to detect information associated with the load of each FTL on the fly, and dynamically adjusting the over-provisioning of multiple FTLs to improve the performance. Thus, a lower-load FTL can release some over-provisioning blocks, to provide a higher-load FTL more over-provisioning blocks.

Figure 4A:
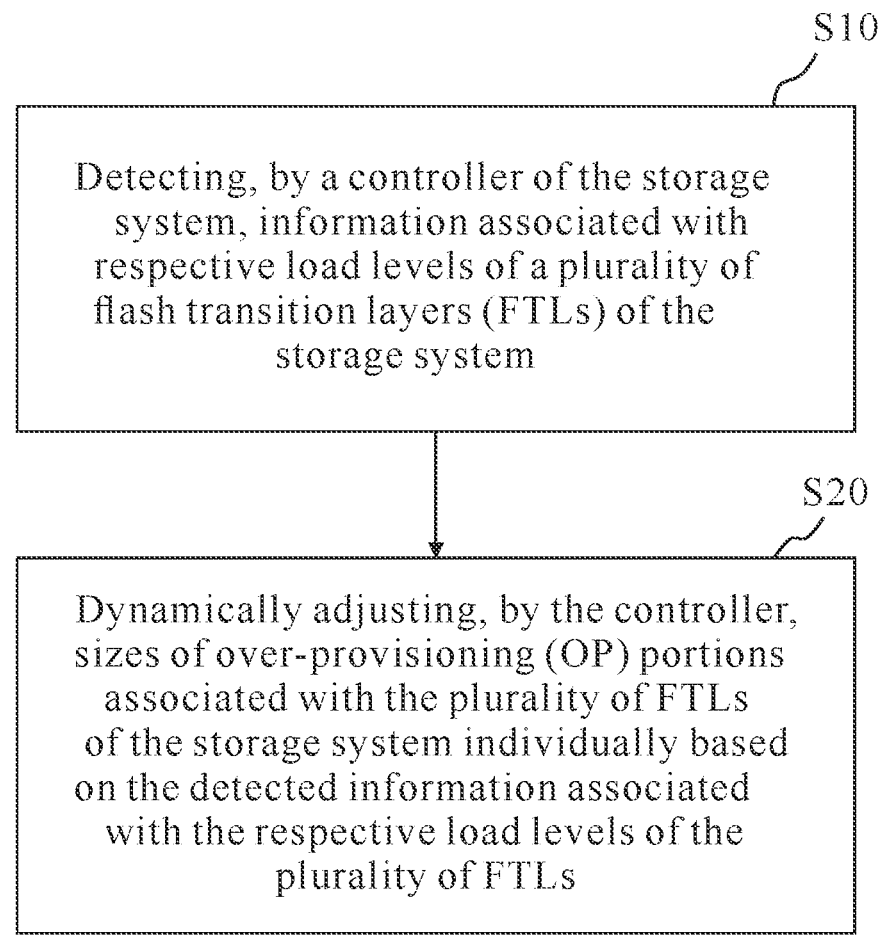
FIG. 4A is a flowchart of a method for operating a storage system according to an embodiment.

FIG. 4A shows a flowchart of a method for operating a storage system according to an embodiment. As shown in FIG. 4A, the method includes steps S10 to S20 below. Elements in FIG. 1-3 may be referenced as examples for the sake of illustration. Certainly, the implementation of the method is not limited to the examples.

In step S10, a controller (e.g., 100 in FIG. 1) of a storage system (e.g., storage device 20 in FIG. 1) detects information associated with respective load levels of a plurality of flash transition layers (FTLs) (e.g., $FTL_1$ to $FTL_y$) of the storage system.

In step S20, the controller (e.g., 100 in FIG. 1) of the storage system (e.g., storage device 20 in FIG. 1) dynamically adjusts sizes of over-provisioning (OP) portions associated with the plurality of FTLs of the storage system individually based on the detected information associated with the respective load levels of the plurality of FTLs. For example, by using the step S20, when a first FTL among the FTLs has a lower load and a second FTL among the FTLs has a higher load, the first FTL with the lower load can be adjusted to release one or more over-provisioning blocks, and the second FTL with the higher load is provided with one or more over-provisioning blocks. In addition, it is noted that the total number of the OP blocks of all FTLs is still a fixed number, regardless of the adjustment of the numbers of the OP blocks for individual FTLs' among all FTLs.

Based on the method based on FIG. 4A, multiple approaches for dynamically managing OP blocks in a storage system (e.g., storage device 20) can be implemented.

Figure 4B:
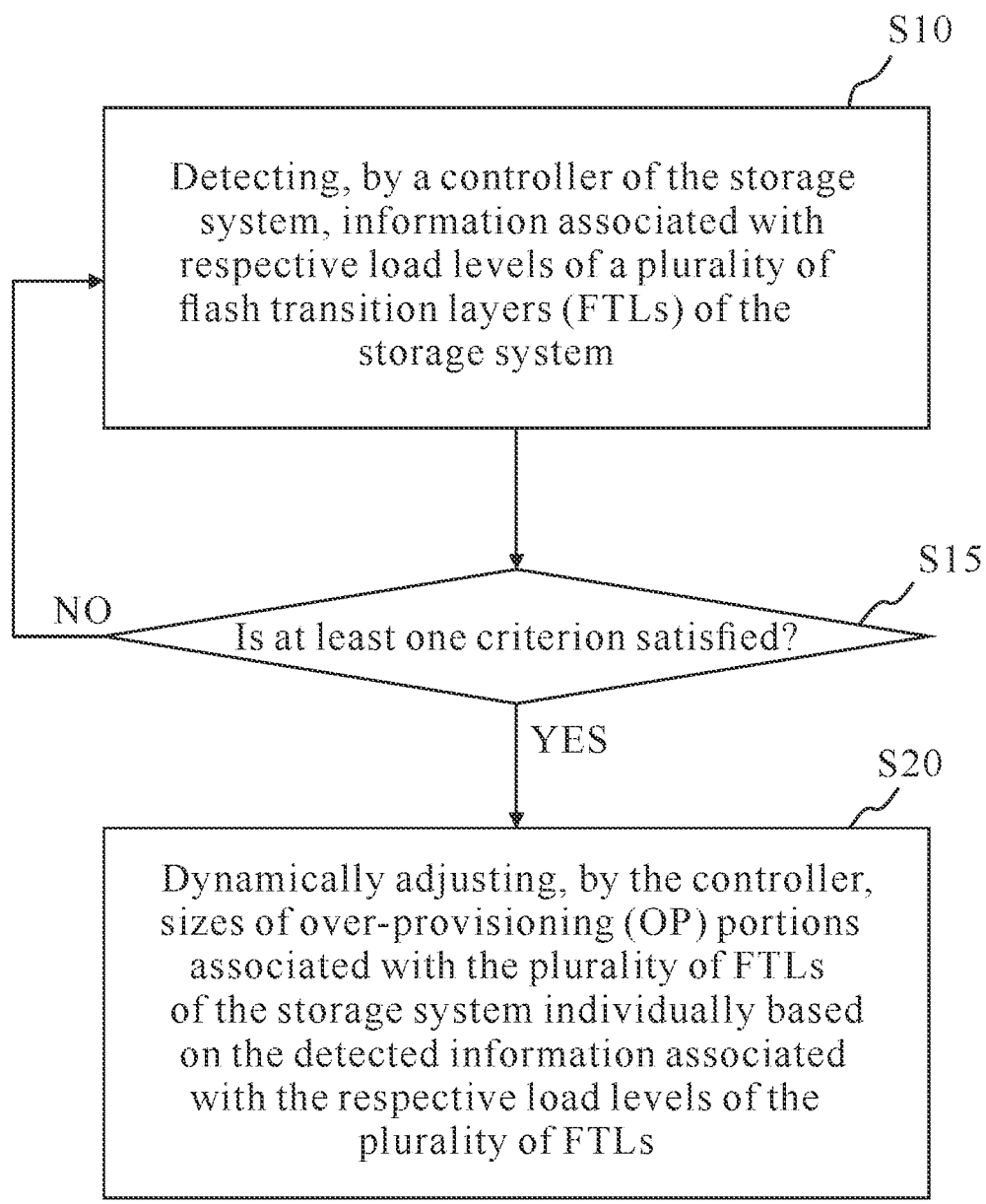
FIG. 4B is a flowchart of a method based on FIG. 4A according to some embodiments.

FIG. 4B shows some embodiments of the method based on FIG. 4A. In particular, in FIG. 4B, step S15 is performed to determine whether at least one criterion is satisfied. If the at least one criterion is satisfied, step S20 is performed; otherwise, the method proceeds with the step S10. Thus, the controller can be configured to perform the step S20 to dynamically adjust over-provisioning portions of the FTLs according to one or more criteria. For example, the controller can be configured to perform the step S20 whenever a specific period of time (e.g., every 0.01 s, 0.1 s, 0.5 s, 1.0 s and so on) is reached. In an example, the controller can be configured to perform the step S20 when the number of access operations reaches a threshold (e.g., 100, 200, 300 or more write operations or write requests). For example, the controller can be configured to perform the step S20 when write amplification gap between two FTLs of the FTLs is equal to or greater than a threshold. The write amplification of an FTL refers to the ratio between the actual amount of data physically written to the storage system and the amount of data logically written (or requested) by the host. The write amplification gap between two FTLs is the difference in write amplification between two FTLs. In an example, the controller can be configured to perform the step S20 whenever the number of total write data amount reaches a threshold (e.g., 1, 2, 5, 10, or so on (GB)). In further example, more criteria can be used in step S15, such as, if the write amplification gap between two FTLs is too large (e.g., greater than a threshold), or after a period of time, or when certain amount of written data is reached, step S20 is performed.

According to some embodiments of the method based on FIG. 4A or FIG. 4B, the method further includes: repeating the step S10 to detect the information associated with the load levels of the FTLs, and repeating the step S20 according to the detected information associated with the load levels. Alternatively, the step S10 can be implemented as a program module for detecting the information associated with the load levels of the FTLs repeatedly, and whenever the controller needs to adjust the sizes of over-provisioning portions of the FTLs, the step S20 can be performed based on the detected information, wherein the step S15 illustrated in FIG. 4B can be implemented as a way to trigger the step S20. Thus, during the operation of the storage device, sizes of over-provisioning (OP) portions can be dynamically and repeatedly updated, enabling the controller to make corresponding adjustments on the sizes of over-provisioning (OP) portions.

Therefore, the embodiments based on the method based on FIG. 4A or 4B are capable of improving the performance of a storage device. The method of FIG. 4A or 4B may be further configured or determined according to requirements.

By using the method based on FIG. 4A or 4B, the size of over-provisioning (OP) portion associated with one of the plurality of FTLs may be dynamically adjusted while the total size of the over-provisioning (OP) portions associated with the plurality of FTLs is fixed. The total size of the over-provisioning (OP) portions can be configured or designed according to the specification or requirement for the storage device. For example, as shown in FIG. 3, the total number of the data blocks, $N_1+N_2 \ldots +N_y$, is a first fixed number while the total number of the OP blocks, $M_1+M_2 \ldots +M_y$, is a second fixed number. Initially, each $FTL_i$ manages its OP portion which has OP blocks of an initial number $M_i$ and the OP portion is associated with such number of blocks in the memory 200A, wherein the OP portions associated with the FTLs may have the same or different number of blocks in the memory 200A for over-provisioning. After the method based on FIG. 4A or 4B is performed, the OP blocks associated with the FTLs may be adjusted such that the number indicated by $M_1, M_2, \ldots, M_y$, may be changed but their total sum will still be a constant (or a fixed number).

Embodiments are further given below to describe various implementation approaches of the method based on FIG. 4A or 4B.

In some embodiments of the method based on FIG. 4A or FIG. 4B, the step S10 includes detecting meta information of one FTL of the FTLs to detect the load level of the FTL. For example, the step S10 can be implemented based on detecting an FTL's write amplification to detect the load level of the FTL. In another example, the step S10 can be implemented further based on analyzing the FTL's write requests information to detect the load level of the FTL.

In some embodiments of the method, the step S20 further includes notifying a first FTL to perform garbage collection (GC) to release free OP blocks when the first FTL is adjusted to have a reduced number of OP blocks.

Figure 5:
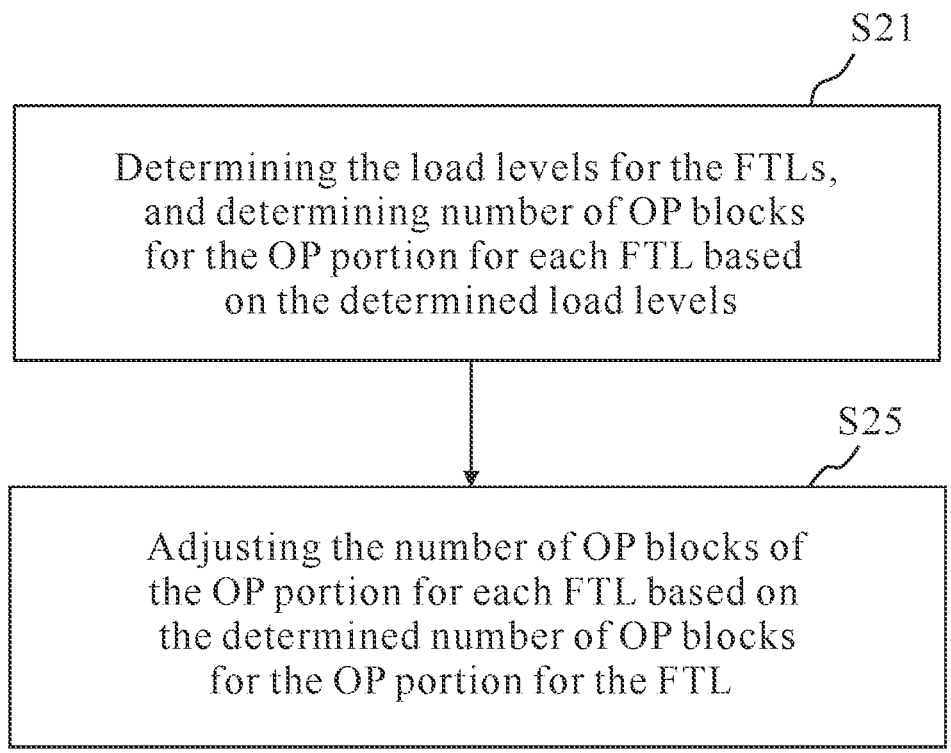
FIG. 5 is a flowchart of an embodiment of step S20.

FIG. 5 shows a flowchart of an embodiment of step S20.

In step S21, the load levels for the FTLs are determined based on the detected information from the step S10, and number of OP blocks for the OP portion for each FTL is determined based on the determined load levels.

In step S25, the number of OP blocks of the OP portion for each FTL is adjusted based on the determined number of OP blocks for the OP portion for the FTL. For example, step S25 is performed to notify FTLs (in the background) to perform GC to release free blocks and re-adjust the number of OP blocks to each FTL.

Figure 6:
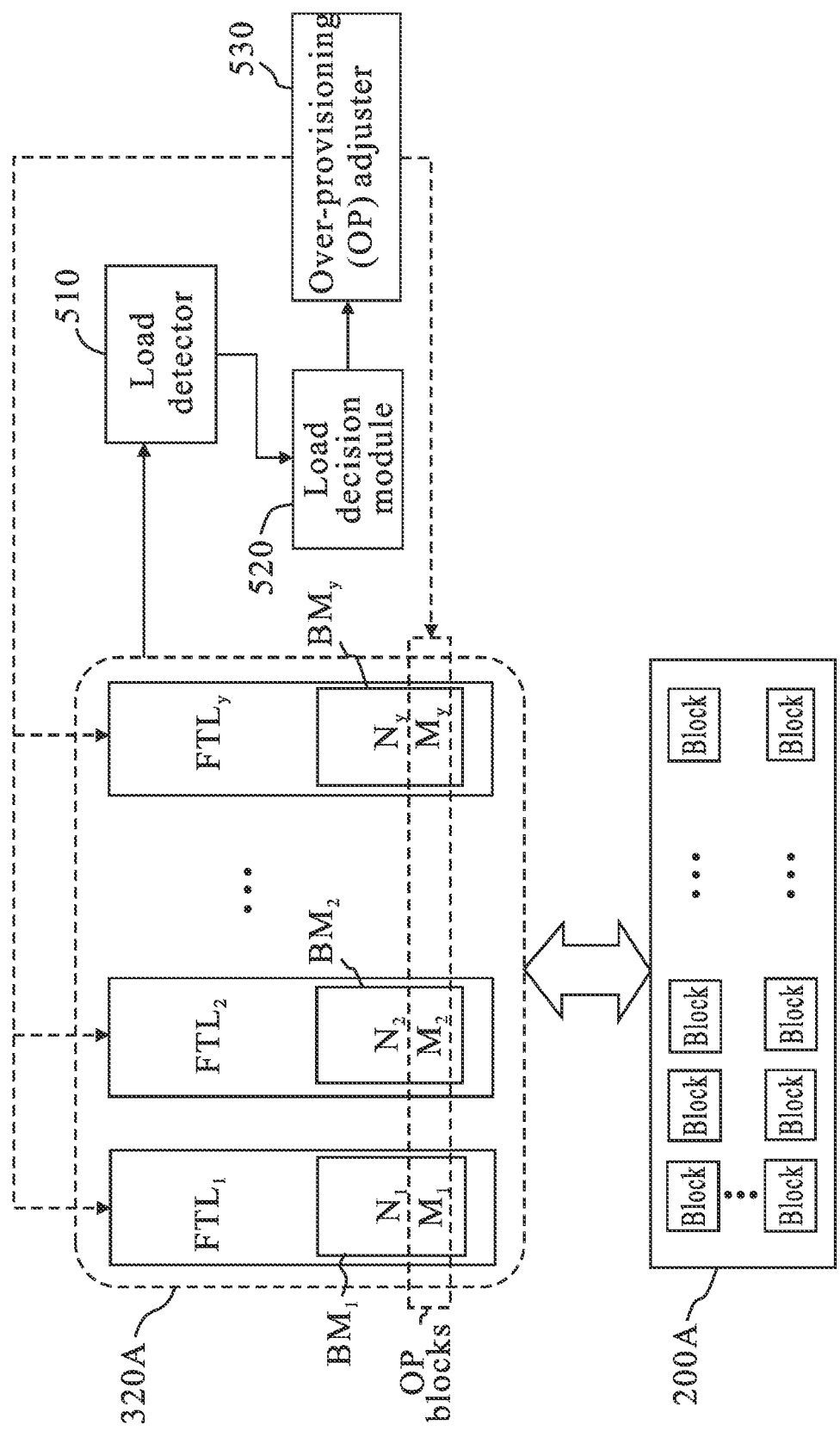
FIG. 6 is a schematic diagram illustrating an embodiment of the controller based on the method based on FIG. 4A or 4B.

FIG. 6 is a schematic diagram illustrating an embodiment of the controller based on the method based on FIG. 4A or 4B. As shown in FIG. 6, the method based on FIG. 4A or 4B can be implemented by a plurality of modules, such as a load detector 510, a load decision module 520, and an over-provisioning (OP) adjuster 530. The load detector 510 performs operations based on the step S10 of FIG. 4A or 4B, or further performs operations based on the step S15 of FIG. 4B. Meanwhile, the load decision module 520 and OP adjuster 530 performs operations based on the step S20 of FIG. 4A or 4B. For example, the load decision module 520 performs operations based on the step S21 of FIG. 5 while the OP adjuster 530 performs operations based on the step S25 of FIG. 5. The modules including the load detector 510, load decision module 520, and over-provisioning (OP) adjuster 530 can be implemented by firmware, hardware, or both firmware and hardware, independent of the FTLs.

Figure 7:
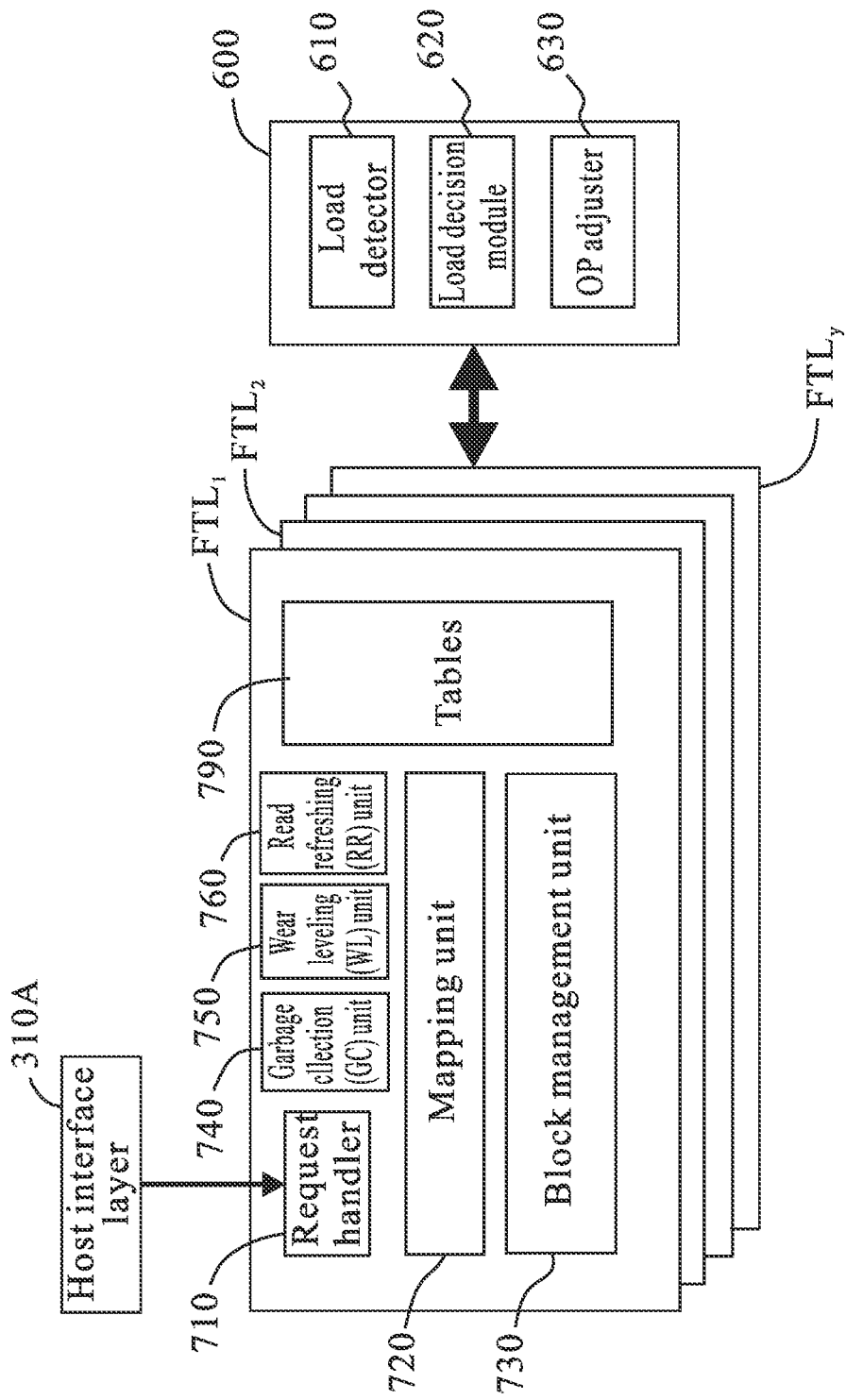
FIG. 7 is a schematic diagram illustrating an embodiment of a firmware architecture of the controller.

FIG. 7 is a schematic diagram illustrating an embodiment of a firmware architecture of the controller. As shown in FIG. 7, the method based on FIG. 4A, FIG. 4B, or FIG. 5 is implemented by an over-provisioning (OP) management module 600 including a load detector 610, load decision module 620, and over-provisioning (OP) adjuster 630. Meanwhile, each FTL of a controller, such as $FTL_1$, $FTL_2$ to $FTL_y$, is implemented based on the firmware architecture illustrated in FIG. 7. For example, the $FTL_1$ includes a request handler 710, a mapping unit 720, a block management unit 730, a garbage collection (GC) unit 740, a wear leveling (WL) unit 750, and a read refreshing (RR) unit 760, wherein a plurality of tables 790 provide or record information related to the $FTL_1$ for access by the associated units of the $FTL_1$. The other FTL such as $FTL_2$ to $FTL_y$ can also be implemented in a manner similar to the $FTL_1$. In addition, the request handler of a FTL, such as request handler 710, receives commands from a host interface layer (HIL), such as the host interface layer 310A. In this embodiment of FIG.

7, the OP management module 600 can be implemented to be executed by a processing unit (or a core of a multi-core processor) while the $FTL_1$, $FTL_2$ to $FTL_y$ can be implemented to be executed by a plurality of processing units (or other cores of a multi-core processor). Certainly, the embodiment is not limited to the examples.

Embodiments of the modules are provided below and the embodiments of the modules can also be regarded as embodiments of the method based on FIG. 4A, 4B or FIG. 5, whenever appropriate.

In some embodiments of the method based on FIG. 4A, 4B or 5, the load detector 510 is configured to detect each FTL's write amplification (WA) and analyze FTL's write requests information. In some embodiments, in addition to detecting FTL's write amplification as a basis for determining the load decision module 520, the load detector 510 can also observe other FTL's meta information, such as free block count, erase count, or so on, to help determine whether the load of a FTL is a higher or lower value. An FTL's free block count, for example, indicates a count which keeps track of how many blocks that are managed by the FTL, do not store valid user data currently and can be used to store user data when the blocks are available for block mapping. An FTL's erase count gap, for example, indicates the difference between a maximum erase count and a minimum erase count for the FTL, wherein an erase count for a block, for example, indicates how many times the block has been erased, the maximum erase count indicates the maximum number of erase count for some data block (e.g., storing dynamic data) among all data blocks for the FTL, and the minimum erase count indicates the minimum number of erase count for some data block (e.g., storing static data) among all data blocks for the FTL. There are some relationships between FTL's meta information and the FTL's load level. For example, when an FTL's write amplification increases, it indicates that the load of the FTL increases because the GC operation becomes frequent. For example, if an FTL's free block count increases, it may facilitate reduction of the FTL's load because the GC frequency is low. For example, if an FTL's erase count gap increases, it may cause increase in the load; if the erase count gap increases, it may cause wear leveling.

In addition, in an embodiment, the load detector 510 can also collect all FTLs' write requests, which can help determine the load level according to their writing behavior. For example, meta information (or referred to as parameters) such as total write data volume, average write size, and random write ratio can be determined based on the FTLs' write requests to indicate writing behaviors from different aspects. The write data volume, for example, indicates a count that keeps track of the total amount of write data of all write commands for a duration for detecting. After adjustment of sizes of the over-provisioning portions, another duration for detecting can be regarded as being started and the write data volume can be reset and keeps track of the total amount of write data of all write commands for that duration for detecting. In addition, the average write size, for example, indicates an average of write size of all write commands for a duration for detecting. Further, the random write ratio, for example, indicates a ratio of number of random write commands to number of all write commands for a duration for detecting. The random write ratio can be expressed by the formula, for example, random write ratio=number of random write commands/(number of sequential write commands+number of random write commands). As an example of a criterion for a random write command, if a write address for a current write command does not have a consecutive relationship with the write addresses for a few number of previous write commands (e.g., 2, 3, or more previous write commands), the current write command is determined as a random write command. By using the meta information, the load level of an FTL can be determined according to the FTL's associated writing behavior. For example, if the total write data volume for the FTL increases, it indicates that the load of the FTL increases. For example, if the average write size for the FTL increases, it indicates that the load of the FTL decreases. For example, if the random write ratio for the FTL increases, it indicates that the load of the FTL increases.

In some embodiments, when the load detector 510 finds that the write amplification gap between two FTLs is too large (e.g., greater than a threshold), or after a period of time, or when certain amount of written data is reached, the load detector 510 can pass the above-mentioned detected data (or referred to as pieces of meta information of the FTLs) to the load decision module 520. The load decision module 520 can determine the load level of each FTL accordingly.

In some embodiments, the load decision module 520 determines the load level (or called load score) based on the detected data (or pieces of meta information) sent by the load detector 510, and then determines the appropriate number of over-provisioning blocks for each FTL. Below is an embodiment of the load decision module 520 to determine the load level. Certainly, the implementation of the load decision module 520 is not limited to the examples.

In an embodiment, the load level (or load score, denoted by $Load\_Score_i$) of an $FTL_i$ is determined based on its associated pieces of meta information, such as write amplification (denoted by $WA_i$), free block count (denoted by $FBlkCnt_i$), erase count gap (denoted by $EraseCntGap_i$), write data volume (denoted by $WrVol_i$), average write size (denoted by $AvgWrSz_i$), and random write ratio (denoted by $RandRat_i$), as mentioned above, and can be expressed by formula A1 as follows:

$$Load\_Score_i = f(WA_i, FBlkCnt_i, EraseCntGap_i, WrVol_i, AvgWrSz_i, RandRat_i),$$

wherein $Load\_Score_i$ is a function $f(\ )$ of different pieces of meta information. When a $Load\_Score_i$ increases, it indicates that the load of the $FTL_i$ increases. In the formula A1, the write amplification, free block count, erase count gap, write data volume, average write size, and random write ratio can be defined as the examples mentioned above. Certainly, the implementation of the present disclosure is not limited to the examples; and the load score for an FTL can be defined as a function of some of the pieces of meta information as mentioned in the formula A1 or a function of more meta information, whenever appropriate.

For example, the total load score can be set as a sum of individual load scores of the FTLs and can be expressed by formula A2 as follows:

$$Total\_Load\_Score = SUM(Load\_Score_i), \text{ wherein } SUM(\ ) \text{ indicates a summation of } Load\_Score_i \text{ from } i=1 \text{ to } i=y.$$

In addition, the load decision module 520 can further determine the size of over-provisioning portion that its associated FTL needs under the load levels determined above. A recommended number of OP blocks for the $FTL_i$ (denoted by $New\_OP\_block_i$) can be determined based on a total load score (denoted by $Total\_OP\_block$) and the $FTL_i$'s load score (denoted by $Load\_Score_i$), for example, expressed by formula A3 as follows:

$$\text{New\_OP\_block}_i = \text{Total\_OP\_block} * (\text{Load\_Score}_i / \text{Total\_Load\_Score}).$$

The OP block number (denoted by $\text{OP\_Delta}_i$) for the $\text{FTL}_i$ for adjustment is the difference between the recommended number of OP blocks and current number of OP blocks and can be expressed by formula A4 as follows:

$$\text{OP\_Delta}_i = \text{New\_OP\_block}_i - \text{Current\_OP\_block}_i.$$

The value of $\text{OP\_Delta}_i$ may be positive, negative, or zero. If $\text{OP\_Delta}_i$ is a positive value, it indicates that the $\text{FTL}_i$ needs to increase its size of OP portion. If $\text{OP\_Delta}_i$ is a negative value, it indicates that the $\text{FTL}_i$ needs to decrease (or release) its size of OP portion. If $\text{OP\_Delta}_i$ is zero, it indicates that the $\text{FTL}_i$ can maintain its size of OP portion.

In the following examples, load scores are determined by two aspects: (1) write amplification and (2) write data volume. The write amplification is obtained from FTL meta information, and the load can be obtained by using management record of the FTL. The write data volume is obtained by recording statistics of contents of write requests and the load is obtained by behaviors of write operations.

By the two main aspects of determination of FTL load, a number of variables are adjusted as follows.

Regarding write amplification, free block count (denoted by $\text{FBlkCnt}_i$) and erase count gap (denoted by $\text{EraseCntGap}_i$) can be used. For the free block count, when number of free block is less than or equal to a GC threshold, FTL can trigger GC operations. If number of free block is far from GC threshold, it is expected that WA will decrease. If number of free block is approaching GC threshold, it is expected that WA will increase.

For the erase count gap, when the difference between a maximum erase count (EC) and a minimum EC is greater than or equal to a wear-leveling (WL) threshold, the FTL can trigger wear-leveling (similar to GC operation). If the difference between the maximum EC and minimum EC is approaching the WL threshold, it is expected that WL is to be performed to increase WA.

Regarding the write data volume, average write size and random write ratio can be used. For the average write size, when average write size is small, it is not convenient to write operation of NAND flash (page program). For the random write ratio, when there are many random write operations, it is not convenient to FTL management (mapping); for example, a file with a large size has to be divided into several portions stored in separate (physical) blocks of the memory 200A.

Accordingly, formula for determination of FTL Load, for example, can expressed by:

$$\text{Adapt\_WA}_i = WA_i + a(\text{FBlkCnt}_i) + b(\text{EraseCntGap}_i) \quad \text{(formula B1)}$$

$$\text{Adapt\_WrVol}_i = \text{WrVol}_i * c(\text{AvgWrSz}_i) * d(\text{RandRat}_i) \quad \text{(formula B2)}$$

$$\text{Load\_Score}_i = \text{Adapt\_WA}_i * \text{Adapt\_WrVol}_i \quad \text{(formula B3)}$$

wherein $a(\cdot)$, $b(\cdot)$, $c(\cdot)$, $d(\cdot)$ indicate associated functions and the formula B3 can be regarded as an embodiment of the formula A1.

Regarding $\text{Adapt\_WA}_i$ (formula B1), examples are provided below. TABLE 1 shows an example of a ($\text{FBlkCnt}_i$) with respect to $\text{FBlkCnt}_i$. For the free block count (denoted by $\text{FBlkCnt}_i$), when number of free block is less than or equal to a GC threshold, FTL can trigger GC operations. If number of free block is far from GC threshold, it is expected that WA will decrease. If number of free block is approaching GC Threshold, it is expected that WA will increase.

TABLE 1

| $\text{FBlkCnt}_i$ | $a(\text{FBlkCnt}_i)$ |
|---|---|
| >GC threshold + 9 | −0.5 |
| ... | ... |
| >GC threshold + 1 | 0.3 |
| ≤GC threshold + 1 | 0.4 |

TABLE 2 shows an example of b ($\text{EraseCntGap}_i$) with respect to $\text{EraseCntGap}_i$. For the erase count gap, when the difference between the maximum EC and minimum EC is greater than or equal to a wear-leveling (WL) threshold, the FTL can trigger wear-leveling (similar to GC operation). If the difference between the maximum EC and minimum EC is approaching WL threshold, it is expected that WL is to be performed to increase WA.

TABLE 2

| $\text{EraseCntGap}_i$ | $b(\text{EraseCntGap}_i)$ |
|---|---|
| >WL threshold − 4 | 0 |
| ... | ... |
| >WL threshold − 1 | 0.2 |
| ≤WL threshold − 1 | 0.4 |

Regarding $\text{Adapt\_WrVol}_i$ (formula B2), examples are provided below. TABLE 3 shows an example of $c(\text{AvgWrSz}_i)$ with respect to $\text{AvgWrSz}_i$. For the average write size (denoted by $\text{AvgWrSz}_i$), when average write size is small, it is not convenient to write operation of NAND flash (page program). Thus, the value of $c(\text{AvgWrSz}_i)$ increases as $\text{AvgWrSz}_i$ decreases.

TABLE 3

| $\text{AvgWrSz}_i$ | $c(\text{AvgWrSz}_i)$ |
|---|---|
| >128 KB | 1 |
| ... | ... |
| >4 KB | 1.03 |
| ≤4 KB | 1.05 |

TABLE 4 shows an example of $d(\text{RandRat}_i)$ with respect to $\text{RandRat}_i$. For the random write ratio (denoted by $\text{RandRat}_i$), when random write ratio is higher, it is not convenient to FTL management. Thus, the value of $d(\text{RandRat}_i)$ increases as random write ratio is higher (e.g., above 90%).

TABLE 4

| $\text{RandRat}_i$ | $d(\text{RandRat}_i)$ |
|---|---|
| <10% | 1 |
| ... | ... |
| <90% | 1.05 |
| ≥90% | 1.1 |

In some embodiments, the OP adjuster 530 is responsible for reallocating the OP blocks of each FTL. For example, using formula A1-A4, $\text{OP\_Delta}_i$ can be determined for each of the $\text{FTL}_i$. The OP adjuster 530 can apply $\text{OP\_Delta}_i$ to reallocating the OP blocks of the FTLs. For example, if OP_Delta$_i$ is greater than zero, it is recommended that the number of OP blocks in FTL$_i$ is to be increased. if OP_Delta$_i$ is less than zero, it is recommended that the number of OP blocks in FTL$_i$ is to be reduced. If number of available blocks in FTL$_i$ is less than |OP_Delta$_i$|, the OP adjuster 530 can trigger the FTLi to do GC operation. If OP_Delta$_i$ is zero, it indicates that the FTL$_i$ needs no adjustment in the number of OP blocks or the adjustment is completed.

In addition, because the OP adjuster 530 needs to trigger FTL to perform GC operations to release free blocks, which will take a lot of time, the OP adjuster 530 can be executed in the background to reduce the impact on the overall performance.

Figure 8:
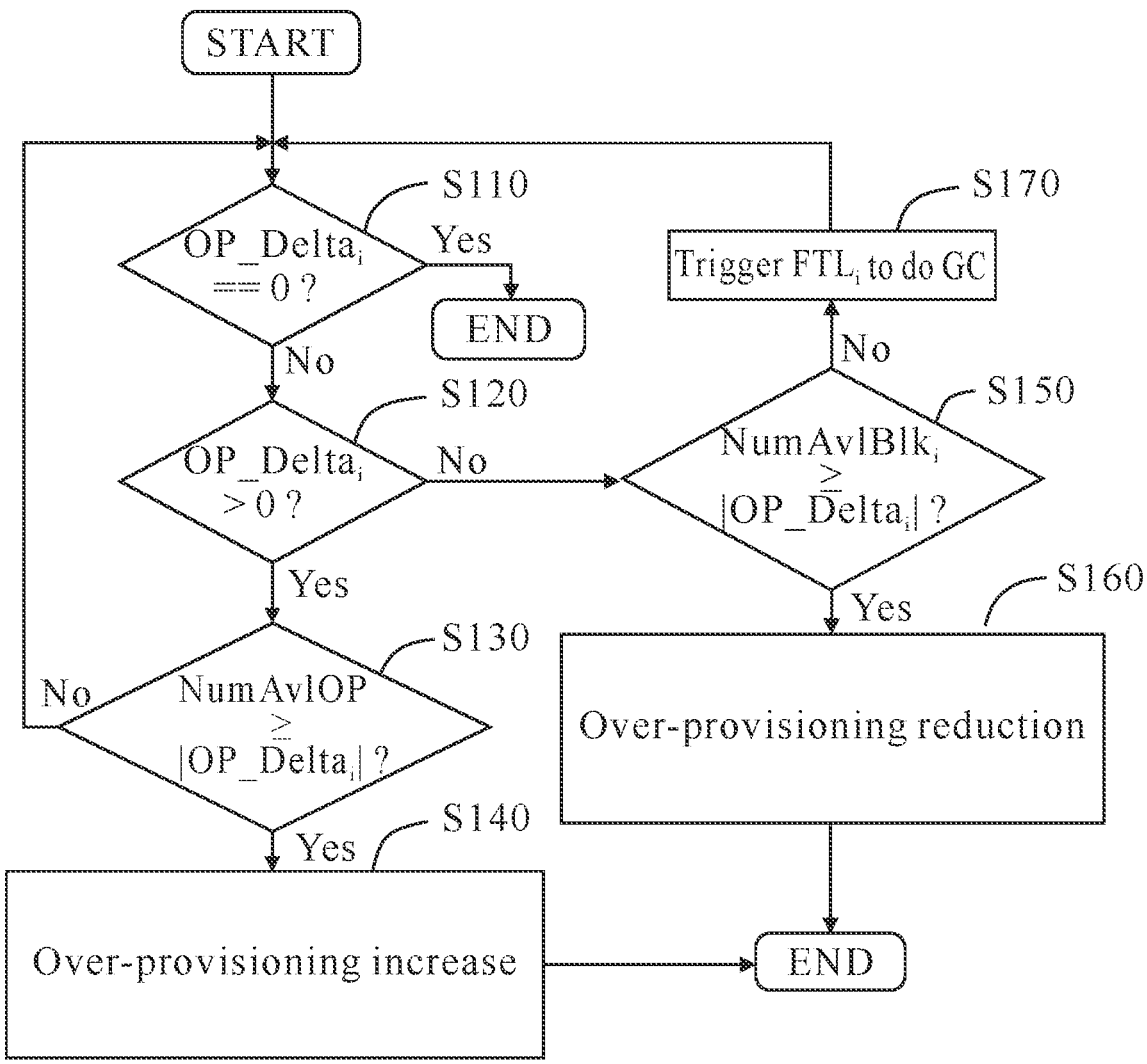
FIG. 8 is a flowchart illustrating an embodiment of an operation method of an over-provisioning adjuster.

FIG. 8 illustrates an embodiment of an operation method for over-provisioning adjuster. Before demonstrating the operation method, some terms used in the embodiment are depicted below. Number of available blocks can be released in FTL$_i$ is denoted by NumAvlBlk$_i$. Number of OP blocks managed in FTL$_i$ is denoted by NumOP$_i$ (e.g., M$_1$, M$_2$, ... , M$_y$ as shown in FIG. 6). Record of available blocks for re-assigning OP blocks is denoted by AvlOP_Pool, which is a temporary record for overall OP management. Number of available blocks in the record of available blocks for re-assigning OP blocks (AvlOP_Pool) is denoted by NumAvlOP.

In step S110, it is determined whether OP_Delta$_i$ is equal to 0. If so, the method ends; otherwise, the method proceeds to step S120.

In step S120, it is determined whether OP_Delta$_i$ is greater than 0. If so, it indicates that it needs to increase the size of OP for a FTL and the method proceeds to step S130. If not, it indicates that it needs to decrease the size of OP for a FTL and the method proceeds to step S150.

In step S130, it is determined whether NumAvlOP is equal to or greater than absolute value of OP_Delta$_i$ (i.e., |OP_Delta$_i$|). If so, the method proceeds to step S140. If not, the method proceeds to step S110 again.

In step S150, it is determined whether NumAvlBlk$_i$ is equal to or greater than absolute value of OP_Delta$_i$. If so, the method proceeds to step S160. If not, the method proceeds to step S170 to trigger FTL$_i$ to perform garbage collection.

Figure 9:
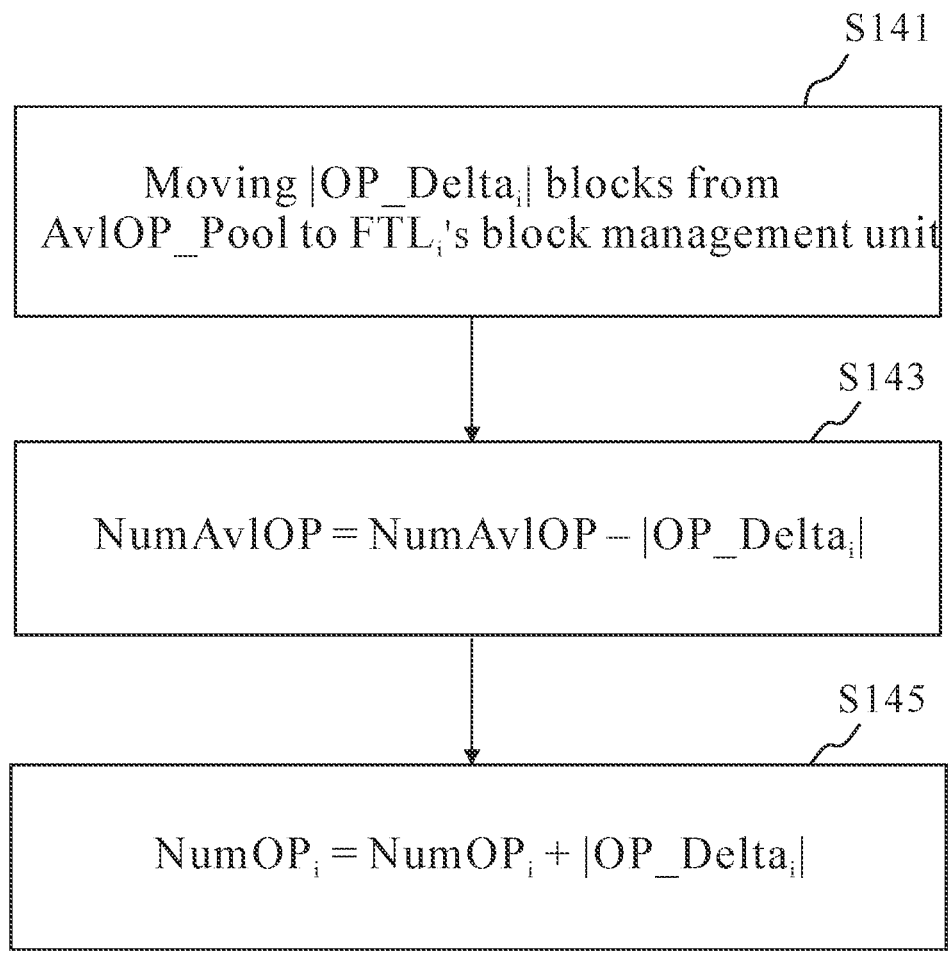
FIG. 9 is a flowchart of an embodiment of step S140.

FIG. 9 shows an embodiment of step S140 for over-provisioning increase.

In step S141, |OP_Delta$_i$| blocks are "moved" from AvlOP_Pool to FTL$_i$'s block management unit. It is noted that the step S141 indicates specifically that the mapping of the |OP_Delta$_i$| blocks has changed from being managed by AvlOP_Pool to being managed by FTL$_i$'s block management unit. In other words, the logical to physical mapping for the |OP_Delta$_i$| blocks has been transferred from AvlOP_Pool to FTL$_i$'s block management unit.

In step S143, new NumAvlOP is determined based on current NumAvlOP and |OP_Delta$_i$|. For example, new NumAvlOP is assigned current NumAvlOP minus |OP_Delta$_i$|, which can be expressed by an assignment statement: NumAvlOP=NumAvlOP−|OP_Delta$_i$|.

In step S145, new NumOP$_i$ is determined based on NumOP$_i$ and |OP_Delta$_i$|. For example, NumOP$_i$=NumOP$_i$+|OP_Delta$_i$|.

Figure 10:
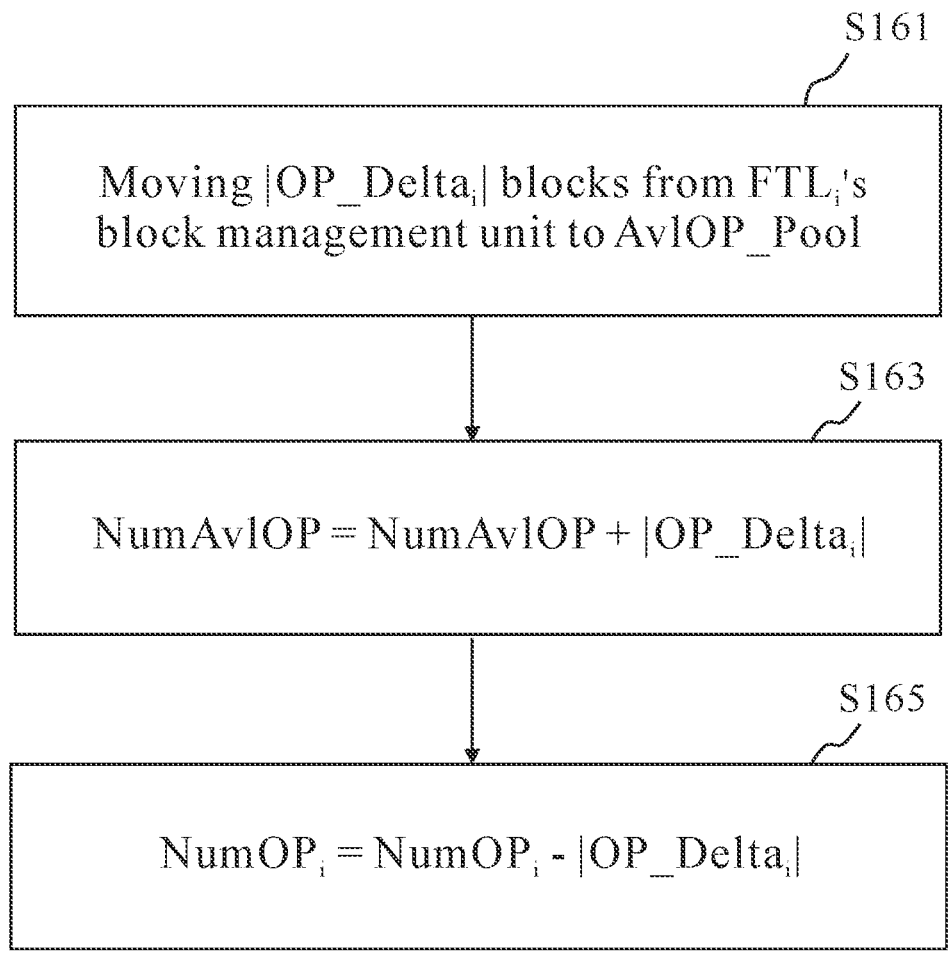
FIG. 10 is a flowchart of an embodiment of step S160.

FIG. 10 shows an embodiment of step S160 for over-provisioning reduction.

In step S161, |OP_Delta$_i$| blocks are "moved" from FTL$_i$'s block management unit to AvlOP_Pool. In other words, the mapping for the |OP_Delta$_i$| blocks is no longer managed by the FTL$_i$'s block management unit and then is free to be changed to being managed by other FTLs.

In step S163, new NumAvlOP is determined based on current NumAvlOP and |OP_Delta$_i$|. For example, new NumAvlOP is assigned the sum of current NumAvlOP and |OP_Delta$_i$|, which can be expressed by an assignment statement: NumAvlOP=NumAvlOP+|OP_Delta$_i$|.

In step S165, new NumOP$_i$ is determined based on current NumOP$_i$ and |OP_Delta$_i$|. For example, NumOP$_i$ is assigned NumOP$_i$ minus |OP_Delta$_i$|, which can be expressed by NumOP$_i$=NumOP$_i$−|OP_Delta$_i$|.

The following examples are provided based on the method as shown in FIG. 4A, 4B, 5, 8-10. It is assumed that a storage system (e.g., a storage device) based on the architecture of FIG. 6 includes a plurality of FTLs, such as FTL$_1$-FTL$_4$. For example, the storage system operates and after a criterion (such as a period of time or number of access operations reaching its associated threshold, or so on) is satisfied, the controller performs the operation method of FIGS. 8-10. TABLE 5 illustrates an example of the OP_Delta$_i$ for each of the FTLs (such as FTL$_1$-FTL$_4$).

TABLE 5

|  | FTL$_1$ | FTL$_2$ | FTL$_3$ | FTL$_4$ |
|---|---|---|---|---|
| OP Delta | +4 | +1 | −2 | −3 |
| NumOP | 10 | 10 | 10 | 10 |
| NumAvlBlk | don't care | don't care | 4 | 2 |
| AvlOP_Pool |  |  |  |  |
| NumAvlOP |  | 0 |  |  |

For FTL$_1$, OP_Delta$_1$ (=+4) is greater than 0, the size of OP portion of FTL$_1$ is to be increased. For FTL$_2$, OP_Delta$_2$ (=1) is greater than 0, the size of OP portion of FTL$_2$ is to be increased. For FTL$_3$, OP_Delta$_3$ (=−2) is less than 0, the size of OP portion of FTL$_3$ is to be reduced. For FTL$_4$, OP_Delta$_4$ (=−3) is less than 0, the size of OP portion of FTL$_4$ is to be reduced.

For FTL$_3$ (regarding OP reduction), since NumAvlBlk (=4) and |OP_Delta$_i$|(=2) as shown in TABLE 5, two available blocks (denoted by x, y) are "moved" from FTL$_3$'s block management unit to AvlOP_Pool, NumAvlOP is set to 2 (=0+2), and NumOP$_3$ is set to 8 (=10−2), as shown in TABLE 6. In TABLE 6, "x" and "y" represent two logical blocks associated with physical blocks in the memory 200A. The "moving" of the block "x" and "y" to AvlOP_Pool indicates that the mapping for blocks "x" and "y" is no longer managed by FTL$_3$ and is free to be changed to be managed by other FTLs.

TABLE 6

|  | FTL$_1$ | FTL$_2$ | FTL$_3$ | FTL$_4$ |
|---|---|---|---|---|
| OP Delta | +4 | +1 | 0 | −3 |
| NumOP | 10 | 10 | 8 | 10 |
| NumAvlBlk | don't care | don't care | 2 | 2 |
| AvlOP_Pool |  |  | x, y |  |
| NumAvlOP |  | 2 |  |  |

In addition, in TABLE 6, for FTL$_4$ (regarding OP reduction), NumAvlBlk$_4$ (=2) is less than |OP_Delta$_i$|(3), and thus the OP adjuster triggers FTL$_4$ to perform GC operation. For FTL$_2$ (regarding OP increase), NumAvlOP is equal to 2 and |OP_Delta$_i$| is equal to 1 in TABLE 6. Thus, one available block (e.g., "x") is "moved" from AvlOP_Pool to FTL$_2$'s block management unit, and for FTL$_2$, NumAvlOP is set to 1 (=2−1) and NumOP$_2$ is set to 11 (=10+1), as shown in TABLE 7. In this manner, the mapping for the block (e.g., "x") is transferred from AvlOP_Pool to the FTL$_2$'s block management unit.

TABLE 7

|  | $FTL_1$ | $FTL_2$ | $FTL_3$ | $FTL_4$ |
| --- | --- | --- | --- | --- |
| OP Delta | +4 | 0 | 0 | −3 |
| NumOP | 10 | 11 | 8 | 10 |
| NumAvlBlk | don't care | don't care | 2 | 2 |
| AvlOP_Pool | | y | | |
| NumAvlOP | | 1 | | |

For $FTL_4$ (regarding OP reduction), one more available block is added after GC (i.e., $NumAvlBlk_4=2+1$), as shown in TABLE 8.

TABLE 8

|  | $FTL_1$ | $FTL_2$ | $FTL_3$ | $FTL_4$ |
| --- | --- | --- | --- | --- |
| OP Delta | +4 | 0 | 0 | −3 |
| NumOP | 10 | 11 | 8 | 10 |
| NumAvlBlk | don't care | don't care | 2 | 3 |
| AvlOP_Pool | | y | | |
| NumAvlOP | | 1 | | |

For $FTL_4$ (regarding OP reduction), since $NumAvlBlk_4$ (=3) is greater than $|OP\_Delta_4|$(=3), then 3 available blocks (denoted by a, b, c) are "moved" from $FTL_4$'s block management unit to AvlOP_Pool. In addition, NumAvlOP is set to 4 (=1+3) and $NumOP_4$ is set to 7 (=10−3), as shown in TABLE 9. In this manner, the mapping for the blocks a, b, and c is no longer managed by $FTL_4$ and is free to be changed to be managed by other FTLs.

TABLE 9

|  | $FTL_1$ | $FTL_2$ | $FTL_3$ | $FTL_4$ |
| --- | --- | --- | --- | --- |
| OP Delta | +4 | 0 | 0 | 0 |
| NumOP | 10 | 11 | 8 | 7 |
| NumAvlBlk | don't care | don't care | 2 | 0 |
| AvlOP_Pool | | y, a, b, c | | |
| NumAvlOP | | 4 | | |

As shown in TABLE 9, for $FTL_1$ (regarding OP increase), since NumAvlOP (=4) is equal to $|OP\_Delta_1|$(=4), 4 available blocks (denoted by y, a, b, c) are "moved" from AvlOP_Pool to $FTL_i$'s block management unit. In addition, NumAvlOP is set to 0 (=4−4) and $NumOP_1$ is set to 14 (=10+4), as shown in TABLE 10. In this manner, the mapping for the blocks (e.g., y, a, b, c) is transferred from AvlOP_Pool to the $FTL_i$'s block management unit. Since $|OP\_Delta_1|$ to $|OP\_Delta_4|$ are all zero, the adjustment for this round as shown in TABLE 10 is completed.

TABLE 10

|  | $FTL_1$ | $FTL_2$ | $FTL_3$ | $FTL_4$ |
| --- | --- | --- | --- | --- |
| OP Delta | 0 | 0 | 0 | 0 |
| NumOP | 14 | 11 | 8 | 7 |
| NumAvlBlk | don't care | don't care | 2 | 0 |
| AvlOP_Pool | | | | |
| NumAvlOP | | 0 | | |

As shown above, management of over-provisioning in a storage system can be implemented to adjust the over-provisioning of multiple FTLs dynamically.

In some embodiments, a storage device is provided including a plurality of memory chips (e.g., the memory 200 shown in FIG. 2) and a controller (e.g., the controller 100 in FIG. 2 or 300 in FIG. 3). The controller is coupled to the plurality of memory chips through multiple memory channels, wherein the controller is configured to perform a plurality of operations including the operations corresponding to the steps S10 to S20 of the method based on FIG. 4A or 4B. In some embodiments, the storage device can be further configured to be programmed to implement at least one or a combination of the plurality of embodiments based on the method based on FIG. 4A or 4B. The storage device may be implemented as a solid-state storage device (SSD), a universal flash storage (UFS), an embedded multimedia card (eMMC), or any other appropriate storage device or a product based on a storage device.

Moreover, in the embodiments (e.g., FIGS. 1-3) associated with a storage device, at least one or a combination of the processing unit 110, the memory channel control unit 140 and the host interface unit 150 may be implemented by one or more circuits, for example, a microprocessor, a processor, or a digital signal processor. Alternatively, the units above may be designed based on Hardware Description Language (HDL) or techniques of other design means of digital circuits generally known to a person skilled in the art, and may be implemented by one or more of circuits based on a field programmable gate array (FPGA), an application-specific integrated circuit (ASIC) or a complex programmable logic device (CPLD), or be implemented by a dedicated circuit or module. In addition, the memory channel control unit may be implemented in the form of software such as a process, thread, program module or other software approaches. However, the implementation of the present disclosure is not limited to the examples above. Moreover, the steps S10 to S30 in FIG. 1 may be implemented by a logic circuit or other appropriate digital circuits.

Further, in some embodiments, a non-transient storage medium is provided. The non-transient storage medium stores program instructions that, when executed by a computing system (e.g., a storage system), cause the storage system (e.g., the storage device shown in FIG. 1, 2 or 3) to perform a method based on FIG. 4A or 4B, which can include one or more of the embodiments of the method based on FIG. 4A, 4B, 5, 8 or so on. For example, the program instructions are one or more programs or program modules and are for performing the steps S10 to S20 in FIG. 4A or 4B, and the program instructions of these modules operate in collaboration or may be executed in any appropriate order or be executed in parallel. When the storage system executes the program instructions, the storage system is caused to perform the method for operating the storage system based on FIG. 4A or 4B according to an embodiment. The non-transient storage medium above may be firmware, a ROM, a RAM, a memory card, an optical information storage medium, a magnetic information storage medium, or any other types of storage media or memories; however, the implementation of the present disclosure is not limited to the examples above.

Thus, a method for operating a storage system, a storage device, and a non-transitory storage medium thereof are provided according to the embodiments above. Accordingly, dynamic over-provisioning management can be implemented in a storage system to adjust the spare capacity allocated to multiple flash translation layers (FTLs) over time. This allows the overall system performance to be optimized by adapting the over-provisioning levels of individual FTLs to meet changing workload demands.

The present disclosure is described by using the embodiments above. A person skilled in the art should understand that, these embodiments are merely for describing the present disclosure and are not to be construed as limitations to the scope of the present disclosure. It should be noted that all equivalent changes, replacements and substitutions made to the embodiments are to be encompassed within the scope of the present disclosure. Therefore, the scope of legal protection of the present disclosure should be defined by the appended claims.

What is claimed is:

1. A method for operating a storage system, comprising steps of:
   (a) detecting, by a controller of the storage system, information associated with respective load levels of a plurality of flash transition layers (FTLs) of the storage system; and
   (b) dynamically adjusting, by the controller, sizes of over-provisioning (OP) portions associated with the plurality of FTLs of the storage system individually based on the detected information associated with at least two load levels of the plurality of FTLs.

2. The method according to claim 1, wherein the step (a) includes detecting write amplification information and analyzing write requests information, for the plurality of FTLs of the storage system.

3. The method according to claim 1, wherein when a difference in write amplification between a first FTL and a second FTL of the plurality of FTLs is equal to or greater than a threshold, the step (b) is performed.

4. The method according to claim 1, wherein when number of access operations reaches a threshold, the step (b) is performed.

5. The method according to claim 1, wherein the step (b) is performed whenever a specific period of time is reached.

6. The method according to claim 1, wherein in the step (b), when a first FTL and a second FTL of the plurality of FTLs have a first load level and a second load level which is less than the first load level, respectively, the controller adjusts the first FTL to release at least one over-provisioning block of the first FTL, and provides the second FTL with at least one over-provisioning block.

7. The method according to claim 1, wherein a total number of the sizes of over-provisioning (OP) portions associated with the plurality of FTLs is a fixed number, regardless of adjustment of the sizes of over-provisioning (OP) portions for individual FTLs' among the plurality of FTLs.

8. The method according to claim 1, wherein the step (b) includes determining the load levels based on the detected information, and determining number of OP blocks for the OP portion for each of the plurality of FTLs based on the determined load levels.

9. The method according to claim 8, wherein the step (b) further includes adjusting the number of OP blocks of the OP portion for an FTL of the plurality of FTLs based on the determined number of OP blocks for the OP portion for the FTL.

10. The method according to claim 8, wherein the step (b) further includes notifying an FTL of the plurality of FTLs to perform garbage collection (GC) to release free OP blocks when the FTL is adjusted to have a reduced number of OP blocks.

11. A non-transitory storage medium which stores program instructions that, when executed by a storage system, cause the storage system to perform the method according to claim 1.

12. A storage device, comprising:
   a plurality of memory chips; and
   a controller, coupled to the plurality of memory chips, wherein the controller is configured to perform a plurality of operations including:
   (a) detecting information associated with respective load levels of a plurality of flash transition layers (FTLs) of the storage system; and
   (b) dynamically adjusting sizes of over-provisioning (OP) portions associated with the plurality of FTLs of the storage system individually based on the detected information associated with at least two load levels of the plurality of FTLs.

13. The storage device according to claim 12, wherein the operation (a) includes detecting write amplification information and analyzing FTL write requests information, for the plurality of FTLs of the storage device.

14. The storage device according to claim 12, wherein when a difference in write amplification between a first FTL and a second FTL of the plurality of FTLs is equal to or greater than a threshold, the operation (b) is performed.

15. The storage device according to claim 12, wherein when number of access operations reaches a threshold or whenever a specific period of time is reached, the operation (b) is performed.

16. The storage device according to claim 12, wherein in the operation (b), when a first FTL and a second FTL of the plurality of FTLs have a first load level and a second load level which is less than the first load level, respectively, the controller adjusts the first FTL to release at least one over-provisioning block of the first FTL, and provides the second FTL with at least one over-provisioning block.

17. The storage device according to claim 12, wherein a total number of the sizes of over-provisioning (OP) portions associated with the plurality of FTLs is a fixed number, regardless of adjustment of the sizes of over-provisioning (OP) portions for individual FTLs' among the plurality of FTLs.

18. The storage device according to claim 12, wherein the operation (b) includes determining the load levels based on the detected information, and determining number of OP blocks for the OP portion for each of the plurality of FTLs based on the determined load levels.

19. The storage device according to claim 18, wherein the operation (b) further includes adjusting the number of OP blocks of the OP portion for an FTL of the plurality of FTLs based on the determined number of OP blocks for the OP portion for the FTL.

20. The storage device according to claim 18, wherein the operation (b) further includes notifying an FTL of the plurality of FTLs to perform garbage collection (GC) to release free OP blocks when the FTL is adjusted to have a reduced number of OP blocks.

* * * * *